(12) United States Patent
Riepold et al.

(10) Patent No.: US 8,005,593 B2
(45) Date of Patent: Aug. 23, 2011

(54) METHOD FOR DETERMINING A TORQUE ON A STEERING TRAIN OF A VEHICLE WITH DYNAMIC DRIVE SYSTEM

(75) Inventors: Thomas Riepold, Frechen (DE); Salvatore Oliveri, Filsen (DE)

(73) Assignee: Tedrive Holding BV (NL)

( * ) Notice: Subject to any disclaimer, the term of this patent is extended or adjusted under 35 U.S.C. 154(b) by 982 days.

(21) Appl. No.: 11/777,080

(22) Filed: Jul. 12, 2007

(65) Prior Publication Data

US 2008/0015750 A1    Jan. 17, 2008

(30) Foreign Application Priority Data

Jul. 13, 2006  (DE) .......................... 10 2006 032 684
Jun. 8, 2007  (DE) .......................... 10 2007 027 057

(51) Int. Cl.
*B62D 6/00*    (2006.01)

(52) U.S. Cl. ......................................................... 701/41
(58) Field of Classification Search ............... 701/41–42, 701/44; 180/6.2, 6.24, 6.5; 477/1
See application file for complete search history.

(56) References Cited

U.S. PATENT DOCUMENTS 6,896,089 B2 * 5/2005 Mills et al. .................... 180/402

* cited by examiner

*Primary Examiner* — Yonel Beaulieu
(74) *Attorney, Agent, or Firm* — Cantor Colburn LLP

(57) ABSTRACT

The present invention relates to a method for determining a torque on a steering train. The method comprises the method steps: determining angular signals through a position sensor of an electric motor which supports the rotational movement of the steering train, determining of measuring and control variables of a dynamic drive system as well as evaluating the angular signals and the measuring and control variables of the dynamic drive system.

20 Claims, 1 Drawing Sheet

METHOD FOR DETERMINING A TORQUE ON A STEERING TRAIN OF A VEHICLE WITH DYNAMIC DRIVE SYSTEM

TECHNICAL FIELD OF INVENTION

The present invention relates to a method for determining the applied torque on a steering system of a motor vehicle.

BRIEF DESCRIPTION OF RELATED ART

With a conventional steering system, steerable wheels are steered by a driver via an actuation unit, more preferably through twisting a steering wheel. The rotating of the steering wheel causes a displacement of a rack which in turn pivots the wheels. In power steerings the steering movement of the driver is supported through an additional electric motor. Here, the steering support is generally performed through characteristic-controlled or regulated systems where the steering support is applied as a function of the vehicle speed.

Electric power steering systems generally utilize a separate torque sensor assigned to the steering system for measuring the steering moment applied to the steering wheel by the driver. This torque sensor usually serves exclusively for measuring the torque but can also be combined with an angle-of-rotation-sensor. In addition to this, indirect torque measurement is also known where, via the twisting angle of two parts of the steering column or the steering gear connected with an elastic element designed for this purpose, such as a torsion bar, the torque is determined. Also known is a direct torque measurement on a component of the steering train for example according to a magneto-elastic principle. However, in each case a moment sensor is required which usually assigned to the power steering (EPAS system) and, if applicable, is integrated in the EPAS system.

Depending on the concept of the control or regulation of the steering system the torque signal is used to amplify the steering commands of the driver in terms of steering support in the same direction of rotation or to adjust a constant torque on the steering wheel in order to give the driver feedback on the steering angle or other dynamic driving parameters.

In addition, steering systems are known where no mechanical connection exists between the steerable wheels and the steering wheel (steer by wire). Here, the wheels are pivoted as a function of the angle of rotation and the rotational speed of the steering wheel with the help of appropriate motors.

Disadvantageous with the known systems is that torque sensors used are elaborately designed and expensive.

In addition, modern vehicles are usually equipped with dynamic drive systems which for example can influence the stability of the vehicle. Such a dynamic drive system continuously determines data for driver support. By linking for example slip control, brake and drive stability systems (ABS, ASC, DSC, ESP, etc.) one succeeds in increasing the active safety and the driving comfort in this way relieving the driver, they help the driver to safely control his vehicle even in critical situations. Such systems come into action only when for example the tyres are at risk of loosing the adhesion, i.e. before the wheel spin, skid or block. Wheel sensors for example monitor how fast the wheels rotate during the braking operation. If a wheel tends to block the brake pressure on the corresponding wheel brake cylinder is automatically reduced so far until the wheel returns to running under normal slip.

With the drive slip control, sensors ensure that the drive Power during acceleration is transmitted with minimal slip. Regardless of the position of the accelerator pedal, only so much engine power is permitted as is possible in the current driving situation without spinning wheel. By sensing the wheel speeds through sensors this system recognizes if the wheels grip safely. If the driven wheels have a tendency towards spinning, the control interferes in the engine management and reduces the torque regardless of the current accelerator pedal position. With the dynamic stability control additional sensors determine additional driving states in order to increase the driving safety during abrupt evasive manoeuvres or sudden danger situations. Expansion of the ABS increases the driving stability particularly when braking in curves. The control system controls the brake pressures below the ABS control threshold through brake pressures of different amounts on the right and left for stabilizing countermoments. In addition, dynamic brake management systems are known which support the braking of the driver or for example accelerate the braking operation.

Sensors determine the yaw rate which indicates how fast the vehicle rotates around its normal axis, the lateral acceleration as dimension for curve radius and speed, the steering angle, which indicates the desired direction and the braking pressure exerted by the driver via the pedal as well as the rotational speed of the individual wheels. The abovementioned embodiments must only be understood exemplarily, drive dynamic data is also determined and utilized through additional systems.

BRIEF SUMMARY OF THE INVENTION

The invention comprises creating a method for determining the torque applied to a steering system which can be manufactured preferably cost-effectively and yet functions reliably and measures accurately.

The invention further provides a method for determining a torque applied by a driver to a steering train with the method steps:
  determining the position of the steered wheels through a position
  sensor of an electric motor which supports the rotational movement of the steering train,
  determining measuring and control variables of the dynamic drive system
  evaluating the angular signals and measuring and control variables of the dynamic drive system and calculating the applied torque values.

With the help of the method it is thus possible without a torque sensor explicitly provided for this purpose to determine the torque applied to the steering train. The torque sensor which is costly and, as additional component, requires space, can be omitted. In addition, a steering angle sensor which is usually integrated in the steering column or in the steering gear, can be abandoned. According to the invention a value is derived for the first time from the data which up to now was only determined for the drive dynamics which is substantial for the steering system and can be converted by said steering system.

In other words the invention utilizes the realization that for instance the electric motor which is available anyhow, supports the rotation of the steering train or a displacement of a rack which pivots the wheels, can always determine an exact position with the help of the integrated proximity switch. In principle, all electric motors which contain a proximity switch are suitable for the method according to the invention such as for example brushless electric motors. Alternatively the position of the steered wheels can also be determined through an angle sensor in the steering train or a linear sensor in the steering gear.

BRIEF DESCRIPTION OF THE DRAWING

The invention is explained in more detail by means of the drawing which forms a part of in which.

DETAILED DESCRIPTION OF THE INVENTION

Figure 1:
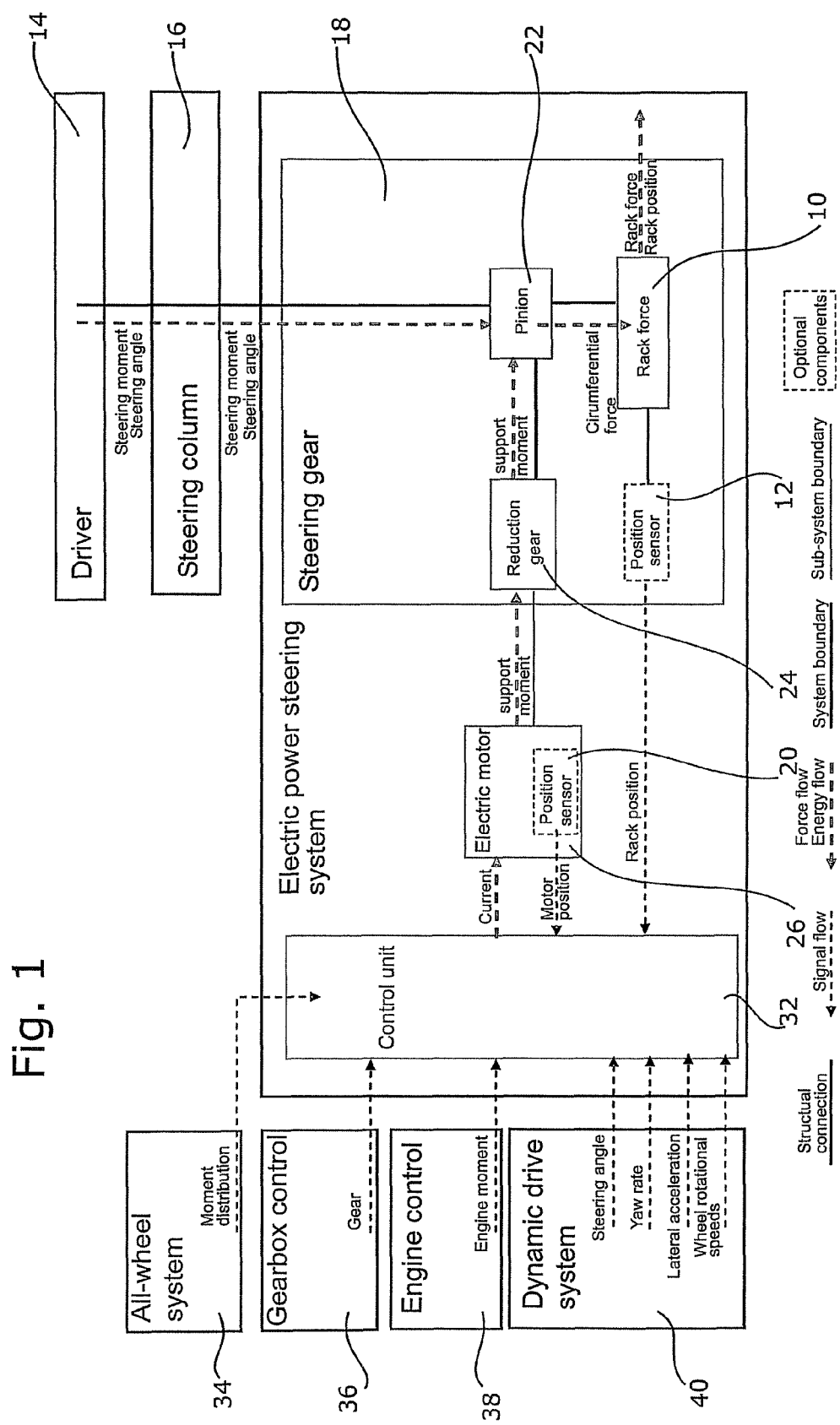
FIG. 1 shows a schematic representation of an electric power steering without torque sensor.

The exemplary embodiment shown here is only intended as an example and not to restrict the invention.

As can be seen from the associated legend, a structural connection, signal flow or force flow or energy flow is possible between the components shown. In addition, system limits and sub-system limits are represented through different line strengths.

A driver 14 applies a steering moment to a steering gear 18 via a steering column 16. The steering gear 18 has a pinion 22 via which the steering moment is transmitted to the rack 10. Optionally a rack position sensor 12, for example a PLCD sensor system, can be arranged on a rack 10. The rack position sensor 12 determines the position of the rack 10 relative to a fixed component, preferably a rack housing.

The steering moment is supported through a reduction gear 24 which in turn is driven by an electric motor 26. The electric motor 26 which supports the rotation of the steering train or a displacement of a rack which pivots the wheels contains a position sensor 20 (angle sensor) from which the current position of the wheels can be deduced.

The values determined by the position sensors 12, 20 are transmitted to a control unit 32. The electric motor 26 is controlled via the control unit 32. In other words, the control unit 32 determines among other things the optimum support moment for the reduction gear 24.

In the exemplary embodiment shown, a determined moment distribution of an all-wheel system 34, the determined gear that is engaged of a gear control 36, the determined engine moment of an engine control 38, as well as the steering angle, the yaw rate, the lateral acceleration and the wheel rotational speeds each determined by a dynamic drive system 40 are additionally transmitted to the control unit 32. The data of the dynamic drive system 40 and the electric motor 26 or the position sensor 20 are sufficient for determining the torque, additional determined data however can also be utilized for analysis of essential driving data according to the invention. The control unit 32 also utilizes the data for controlling methods such as for instance ABS, ASC, DSC, ESP etc.

The method according to the invention is characterized through a sensing and control of the steering moment without own steering moment sensor of the known designs through evaluation of the parameterised measuring and control variables at least from the dynamic drive system 40 of the vehicle and the proximity switch 20 of the electric motor 26, i.e. without torque sensing and steering angle sensing hardware.

The invention is not restricted to the described exemplary embodiment but also comprises all embodiments having the same effect.

The invention claimed is:

1. A method for determining a torque applied to a steering train by a driver, the method comprising:
    determining angular systems through a position sensor integrated with an electric motor that supports the rotational movement of the steering train,
    determining of measuring and control variables of a dynamic drive system,
    evaluating the angular signals and the measuring and control variables of the dynamic drive system and calculating the torque applied.

2. The method according to claim 1, wherein in that a position sensor is used in the steering train.

3. The method according to claim 1, wherein a linear sensor is used in the steering gear.

4. The method according to claim 1, wherein said electric motor is a brushless electric motor.

5. The method according to claim 1, wherein a control unit for determining the torque is provided.

6. The method according to claim 5, wherein the control unit receives data from the group steering angle, yaw rate, lateral acceleration and wheel rotational speed from the dynamic drive system.

7. The method according to claim 5, wherein the control unit continues to receive a determined moment distribution from an all-wheel system.

8. The method according to claim 5, wherein the control unit continues to receive a determined engine moment from an engine control.

9. The method according to claim 5, wherein the control unit continues to receive a determined engaged gear from a gear control.

10. The method according to claim 1, wherein the steering system has no mechanical connection between wheels and a steering wheel.

11. A method for determining a torque applied to a steering train by a driver, with the method steps:
    determining the position of the steered wheels by means of a position sensor integrated with an electric motor,
    determining measuring and control variables of a dynamic drive system,
    evaluating the angular signals and the measuring and control variables of the dynamic drive system and calculating of the applied torque.

12. The method according to claim 11, wherein the position sensor is used in the steering train.

13. The method according to claim 11, wherein a linear sensor is used in the steering gear.

14. The method according to claim 11, wherein said electric motor is a brushless electric motor.

15. The method according to claim 11, wherein a control unit for determining the torque is provided.

16. The method according to claim 15, wherein the control unit receives data from the group steering angle, yaw rate, lateral acceleration and wheel rotational speed from the dynamic drive system.

17. The method according to claim 15, wherein the control unit continues to receive a determined moment distribution from an all-wheel system.

18. The method according to claim 15, wherein the control unit continues to receive a determined engine moment from an engine control.

19. The method according to claim 15, wherein the control unit continues to receive a determined engaged gear from a gear control.

20. The method according to claim 11, wherein the steering system has no mechanical connection between the wheels and a steering wheel.

* * * * *